United States Patent [19]

Ubagai

[11] Patent Number: 5,052,239
[45] Date of Patent: Oct. 1, 1991

[54] TRANSMISSION ASSEMBLY FOR THE USE IN VEHICLES

[75] Inventor: Toshikazu Ubagai, Shizuoka, Japan

[73] Assignee: Suzuki Jidosha Kogyo Kabushiki Kaisha, Shizuoka, Japan

[21] Appl. No.: 395,752

[22] Filed: Aug. 18, 1989

[30] Foreign Application Priority Data

Aug. 29, 1988 [JP] Japan .................................. 63-214708

[51] Int. Cl.$^5$ .............................................. B60K 20/02
[52] U.S. Cl. .................................................. 74/473 R
[58] Field of Search ................. 74/473 R, 473 P, 477, 74/479, 331, 333, 335

[56] References Cited

U.S. PATENT DOCUMENTS

| 1,970,690 | 8/1934 | Churchill | 74/473 R |
|---|---|---|---|
| 2,083,715 | 6/1937 | Kesling | 74/473 R |
| 2,157,249 | 5/1939 | Tenney et al. | 74/473 R |
| 2,250,820 | 7/1941 | Backus | 74/473 R |
| 2,252,080 | 8/1941 | Lapsley | 74/473 R |
| 2,312,975 | 3/1943 | Peterson et al. | 74/473 R |
| 3,768,328 | 10/1973 | Campbell | 74/471 X |
| 4,143,560 | 3/1979 | Kinkade et al. | 74/473 R |
| 4,583,417 | 4/1986 | Hurlow | 74/473 R |
| 4,601,214 | 7/1986 | Fukuchi | 74/477 |
| 4,608,877 | 9/1986 | Okubo et al. | 74/473 R |
| 4,827,792 | 5/1989 | Uetake et al. | 74/473 R |
| 4,873,883 | 10/1989 | Venant | 74/473 R |
| 4,916,964 | 4/1990 | Crack | 74/473 P |

FOREIGN PATENT DOCUMENTS

| 084751 | 8/1983 | European Pat. Off. | |
| 273874 | 7/1988 | European Pat. Off. | |
| 38108 | 12/1933 | Netherlands | 74/473 R |
| 8802453 | 4/1988 | PCT Int'l Appl. | 74/473 R |

Primary Examiner—Allan D. Herrmann
Assistant Examiner—Khoi Q. Ta
Attorney, Agent, or Firm—Flynn, Thiel, Boutell & Tanis

[57] ABSTRACT

A transmission assembly for a vehicle including a transmission casing, at least two generally parallel transmission shafts rotatably supported within the casing, gears coacting between the transmission shafts for defining plural drive paths having different speed ratios, axially shiftable clutches coacting with the gears for permitting selection of different drive ratios between the transmission shafts, and a shifting and selecting mechanism for the clutches. The last-mentioned mechanism comprises a shift and select unit having a shift and select shaft which is rotatably and axially slidably supported relative to the casing. The shaft projects into the interior of the casing in generally perpendicular relationship with respect to the rotational axes of the transmission shafts. The shift and select shaft has a shaft end portion which projects outwardly through the wall of the transmission casing for a selected axial extent. A shift lever is nonrotatably coupled adjacent the outer end of the shaft end portion and projects radially thereof exteriorly of the casing for effecting angular displacement of the shaft. A select lever is rotatably supported but axially coupled to the shaft end portion adjacent the outer end thereof for effecting axial displacement of the shaft.

4 Claims, 6 Drawing Sheets

TRANSMISSION ASSEMBLY FOR THE USE IN VEHICLES

FIELD OF THE INVENTION

This invention relates to a transmission assembly for a vehicle, particularly of the type wherein a shift and select shaft is used both for a shifting and selecting operation in order to attain a change of speed.

BACKGROUND OF THE INVENTION

As a remote control system of a transmission assembly for use in a vehicle, there are shift and select shaft types, torsion shaft types, and cam types.

Particularly in the shift and select type, a shift fork shaft connected with a shift fork is provided at one end thereof with a shift shaft adapted to perform only a shifting operation and a select shaft adapted to perform only a selecting operation. These two shafts are disposed at right angles with respect to each other and with respect to shift and select levers respectively connected with an outer side of the transmission assembly, so that a change of speed would be effected by the respective levers.

The above-mentioned transmission assembly for use in vehicles is disclosed in Japanese Utility Model Publication No. Sho 62-21810. The transmission assembly disclosed in this publication is abutted against a casing in a neutral position of or in the vicinity of a shift head for any one of an idler gear, a shift arm and a shift head in order to prevent generation of different noises during its reciprocal movement and to effectively return the shift head and the shift arm to a predetermined position. Also, there is a change speed operating mechanism for a manual-operated gear changer as disclosed in Japanese Utility Model Publication No. Sho 63-4850.

In the conventional transmission assembly, when the transmission assembly is assembled, a link mechanism of a select system is mounted on a transmission case.

Owing to the above-mentioned arrangement, the following disadvantages arise. A shift change mechanism portion comprising the shift system link mechanism and the select system link mechanism cannot be assembled, the number of working processes is increased in the assembly line, difficulty is encountered when it is manufactured, much time is required for assembling work, and costs are increased and thus the arrangement is uneconomical.

It is therefore an object of the present invention to provide a transmission assembly for a vehicle in order to eliminate the above-mentioned disadvantages, in which a shift and select unit comprises a shift and select shaft inserted into a transmission case in such a manner as to intersect at right angles with the transmission case and a shift system link mechanism and a select system link mechanism which are mounted on and carried by one end of the shift and select shaft, whereby the shift system link mechanism and the select system link mechanism can be readily assembled, the number of assembling steps can be reduced in the assembly line, and a part of the shift and select unit which is exposed outside the transmission case can be made small.

In order to achieve the above-mentioned object, the present invention relates to a vehicle transmission assembly including a shift system link mechanism and a select system link mechanism respectively mounted on an outer part of a transmission case, a shift and a select unit comprising a shift and select shaft which is to be inserted into said transmission case in such a manner as to be intersected with said transmission case at right angles, and said shift system link mechanism and said select system link mechanism which are integral with said unit at one end of said shift and select shaft.

The transmission assembly of the present invention is constructed such that the shift system link mechanism and the select system link mechanism are assembled beforehand, the number of assembling processes along the assembly line is reduced, and a part of the shift and select unit which is exposed outside the transmission case is made small.

DETAILED DESCRIPTION

Figure 2:
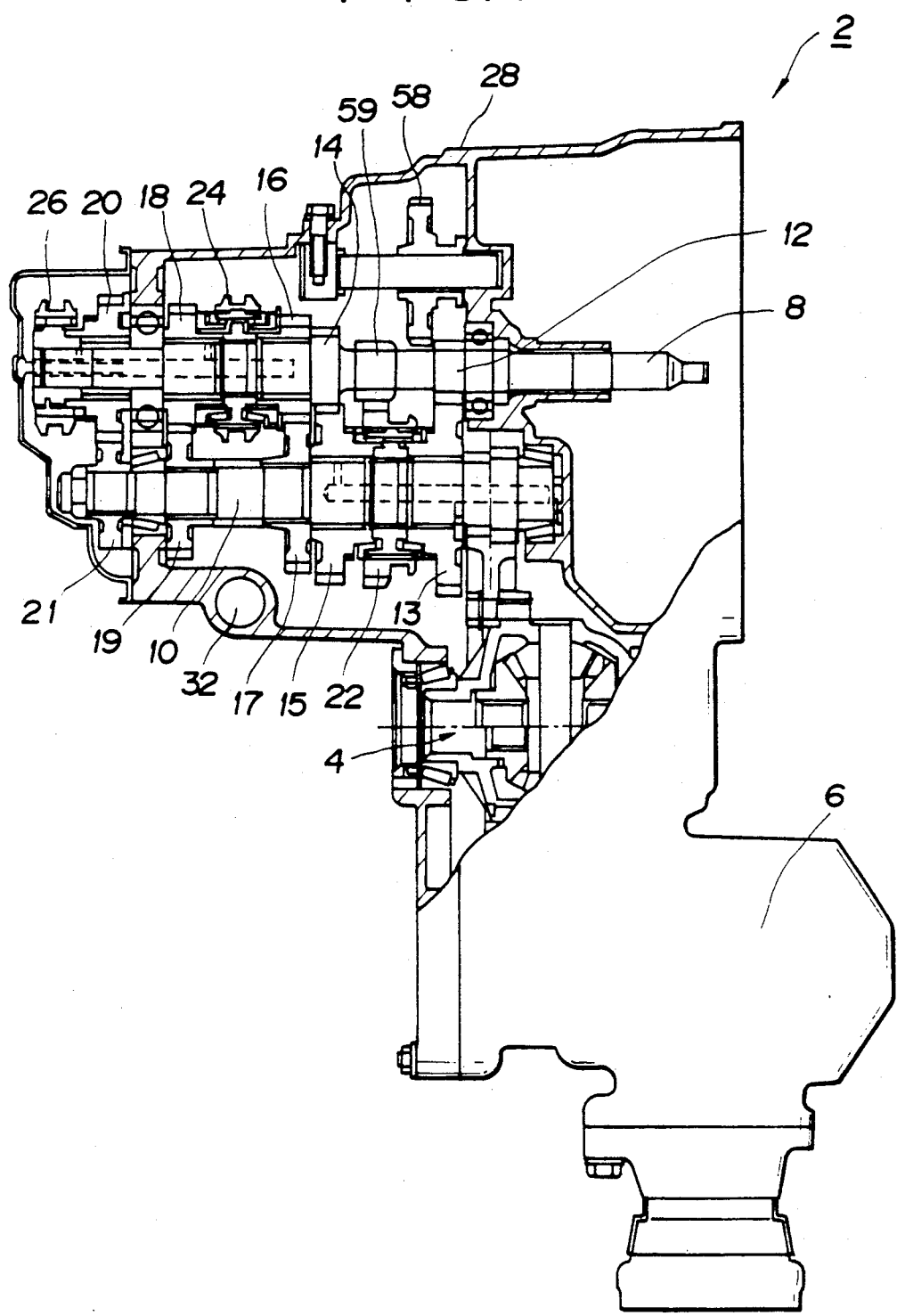
FIG. 2 is a sectional view, partly cut away, of a fifth speed transmission assembly.

In FIG. 2, 2 denotes a manual-operated transmission assembly for use in a vehicle, for example a five-speed type, 4 denotes a speed reduction front wheel differential gear, and 6 denotes a transfer.

The manual-operated transmission assembly 2 includes an input shaft 8 for inputting a driving force from an internal combustion engine (not shown), and a countershaft 10 for transmitting a turning effort of the input shaft 8 to the differential gear 4 which in turn drives the vehicle wheel.

The input shaft 8 has a first driving speed-use gear 12 nonrotatably mounted thereon and maintained in meshing engagement with a first speed driven gear 13 which is rotatably supported on countershaft 10. A second driving speed-use gear 14 is also nonrotatably mounted on input shaft 8 and is in meshing engagement with a driven second-speed gear 15 which is rotatably supported on countershaft 10. A low speed clutch sleeve 22 is nonrotatably but axially slidably supported on countershaft 10 for axially shifting engagement between driven gears 13 and 15 to permit selection of first and second transmission speeds. Third and fourth driving speed-use gears 16 and 18, respectively, are rotatably supported on the input shaft 8 and are respectively maintained in meshing engagement with third and fourth driven gears 17 and 19 which are nonrotatably secured to the countershaft 10. A high speed clutch sleeve 24 is nonrotatably but axially slidably coupled to the input shaft 8 and is axially shiftable between the third and fourth driving gears 16 and 18 for permitting positioning of the transmission into the third and fourth speed positions. A fifth speed-use driving gear 20 is rotatably supported on input shaft 8 and maintained in meshing engagement with a driven fifth speed gear 21 which is nonrotatably coupled to the countershaft 10. A fifth speed clutch sleeve 26 is nonrotatably but axially shiftably supported on the input shaft 8 for selected engagement with the gear 20 when the transmission is to be disposed in a fifth speed position.

The transmission case 28 of the transmission assembly 2 is formed at a diagonally lower surface part thereof, for example, at a lower part off to the front side in FIG. 2, with a mounting hole 32 for mounting therein a shift and select unit 30 (FIG. 1) as a shift change mechanism, as described hereinafter.

The shift and select unit 30 (FIGS. 1 and 6) is integrally formed of a shift and select shaft 34, and a shift system link mechanism 36 and a select system link mechanism 38 which are both mounted on one end 34a of the shaft 34.

More specifically, the shift and select shaft 34 has the one end 34a thereof rotatably and slidably mounted within a sleevelike mounting portion 40, the latter at its inner end having an enlarged flange 40a which is adapted to be secured, as by bolts or the like, to the transmission case 28 when the unit 30 is mounted on the transmission.

Figure 6:
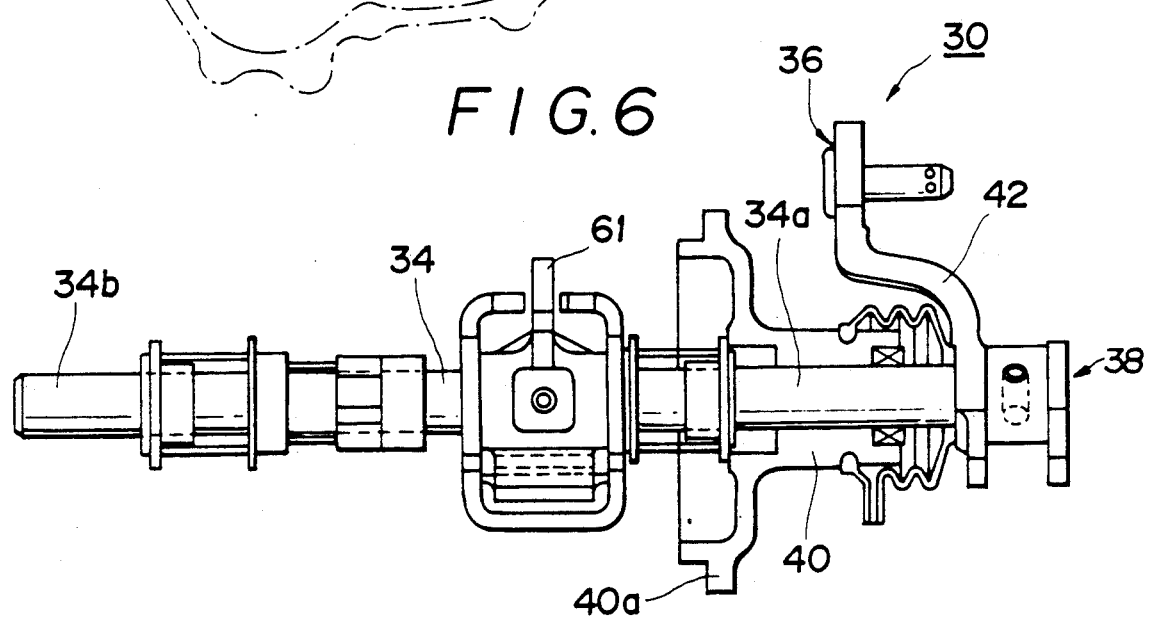
FIG. 6 is a schematic sectional view of the shift and select unit.

The outer free end of shaft end 34a projects outwardly beyond the mounting sleeve portion 40 and, as illustrated in FIG. 6, has the shift system link mechanism 36 secured thereto. More specifically, this shift system link mechanism 36 includes a shift lever 42 which is nonrotatably coupled to the outwardly projecting end of the shaft end portion 34a, whereby this shift lever 42 projects radially outwardly from the shaft 34 and hence is adapted to effect rotational displacement of the shaft 34 about its longitudinal axis.

Figure 1:
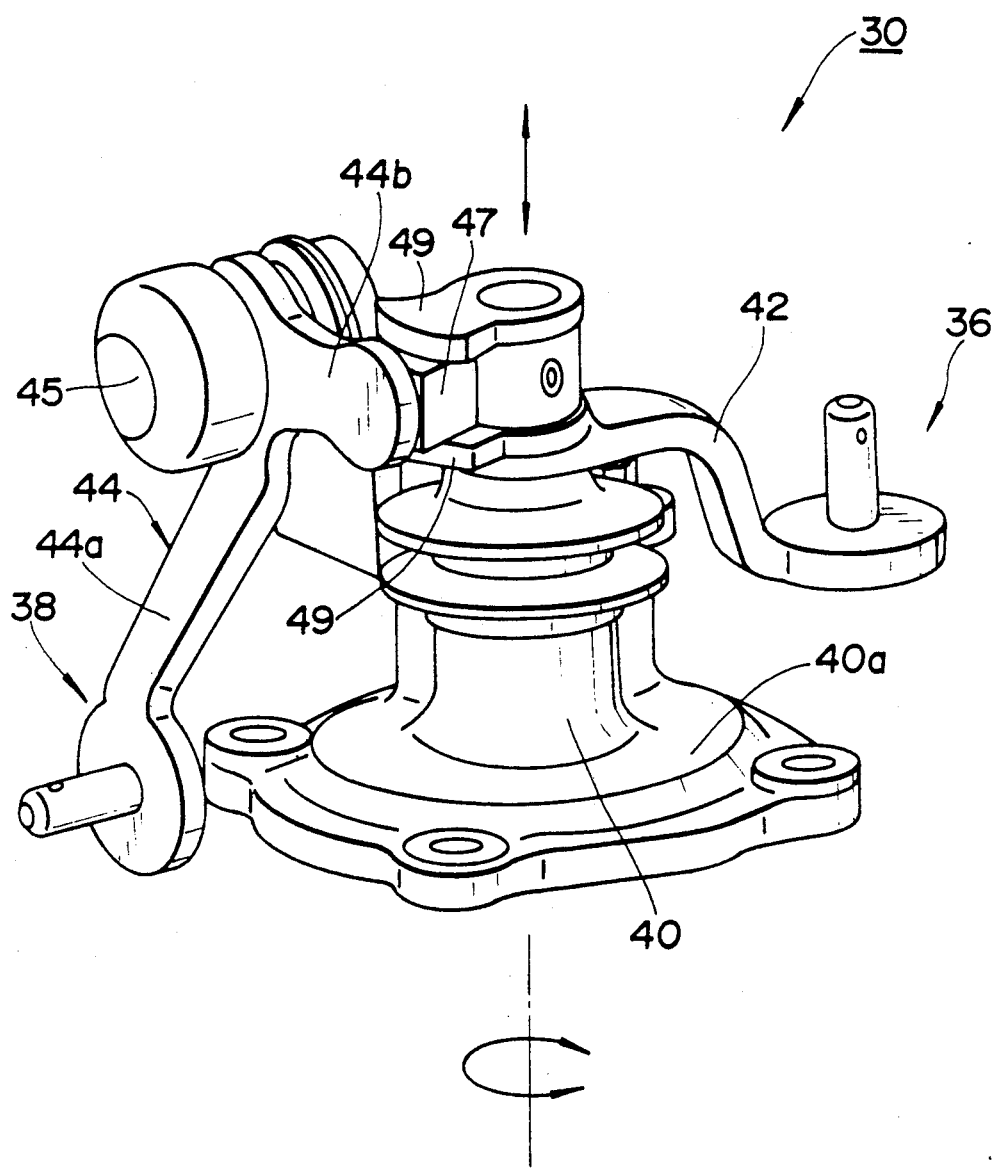
FIG. 1 is a schematic perspective view of a shift and select the present invention.

The select system link mechanism 38 is also coupled to this outwardly projecting free end of the shaft end portion 34a in close proximity to the shift lever 42. As illustrated by FIGS. 1 and 6, the select mechanism 38 includes a select lever 44 which is formed substantially as an L-shaped crank having rigidly joined arms 44a and 44b so as to project at substantial angles with respect to one another, and the crank 44 is hingedly supported by a suitable hinge or pivot pin 45 disposed substantially at the apex of the crank. Hinge pin 45 is mounted on the mounting portion 40 and disposed so that its hinge axis extends generally perpendicularly with respect to the axis of shaft 34. The end of one crank arm 44a is coupled to an operating lever (not shown) of the transmission and the free end of the other crank arm 44b has an actuator part 47 which is radially slidably confined between flanges 49 which are secured to and project radially of the shaft end 34a. Hence, when the crank 44 oscillates about the pivot 45, there is caused a corresponding axial displacement of the shaft 34.

Figure 5:
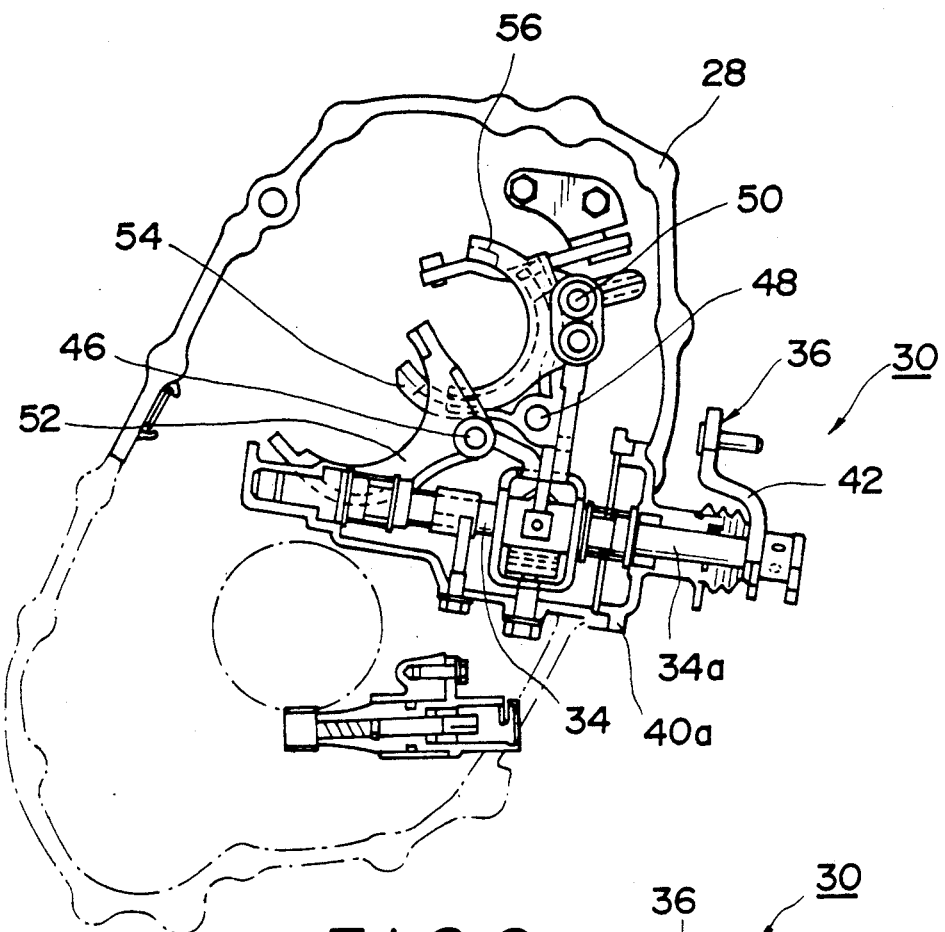
FIG. 5 is a schematic sectional view of the manual-operated transmission assembly showing a mounting state of the and select unit.
Figure 7:
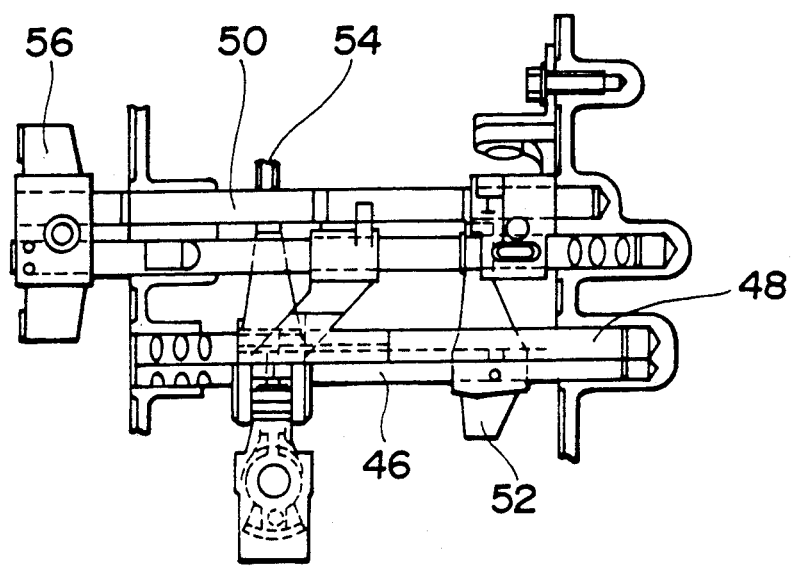
FIG. 7 a schematic view showing a mounting state of various forks.

The manual-operated transmission assembly 2, as shown in FIGS. 5 and 7, is also provided therein with a first fork shaft 46, a second fork shaft 48, and a third fork shaft 50. The first fork shaft 46 is axially attached with a low speed fork 52 which engages clutch sleeve 22, the second fork shaft 48 is axially attached with a high speed fork 54 which engages clutch sleeve 24, and the third fork shaft 50 is axially attached with a fifth speed-use fork 56 which is engaged with the clutch sleeve 26.

Reference numeral 34b denotes the other end of the shift and select shaft 34, and 58 denotes a reverse idler gear.

The assembly and operation will now be described.

First, at a time when the shift and select unit 30 is formed, the link mounting portion 40 is slidably mounted on the one end 34a of the shift and select shaft 34, and then, the shift lever 42 and the select lever 44 are rotatably mounted on the link mounting portion 40, respectively.

Figure 3:
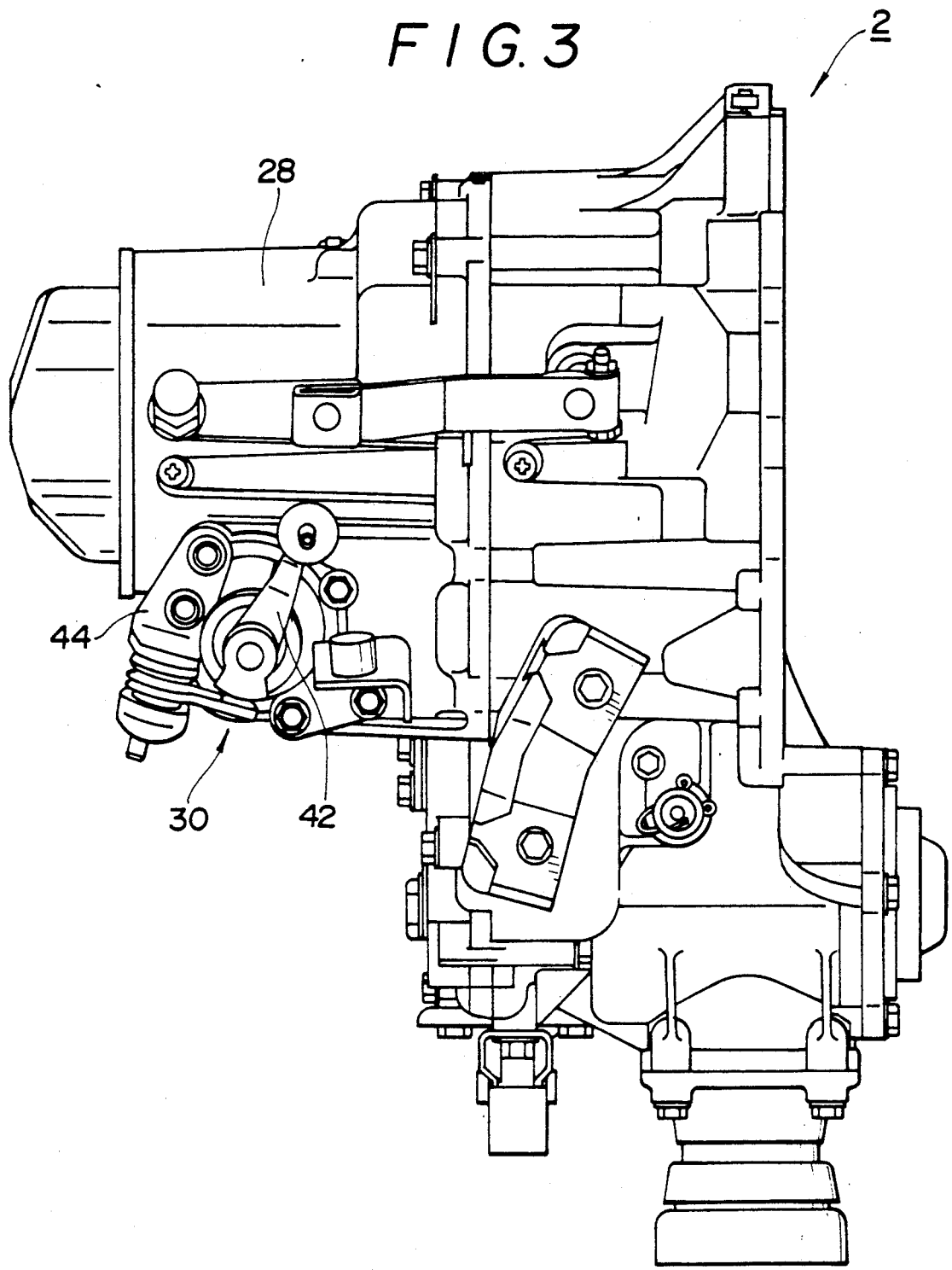
FIG. 3 is a front view of the manual-operated transmission assembly showing a mounting state of the shift and unit.
Figure 4:
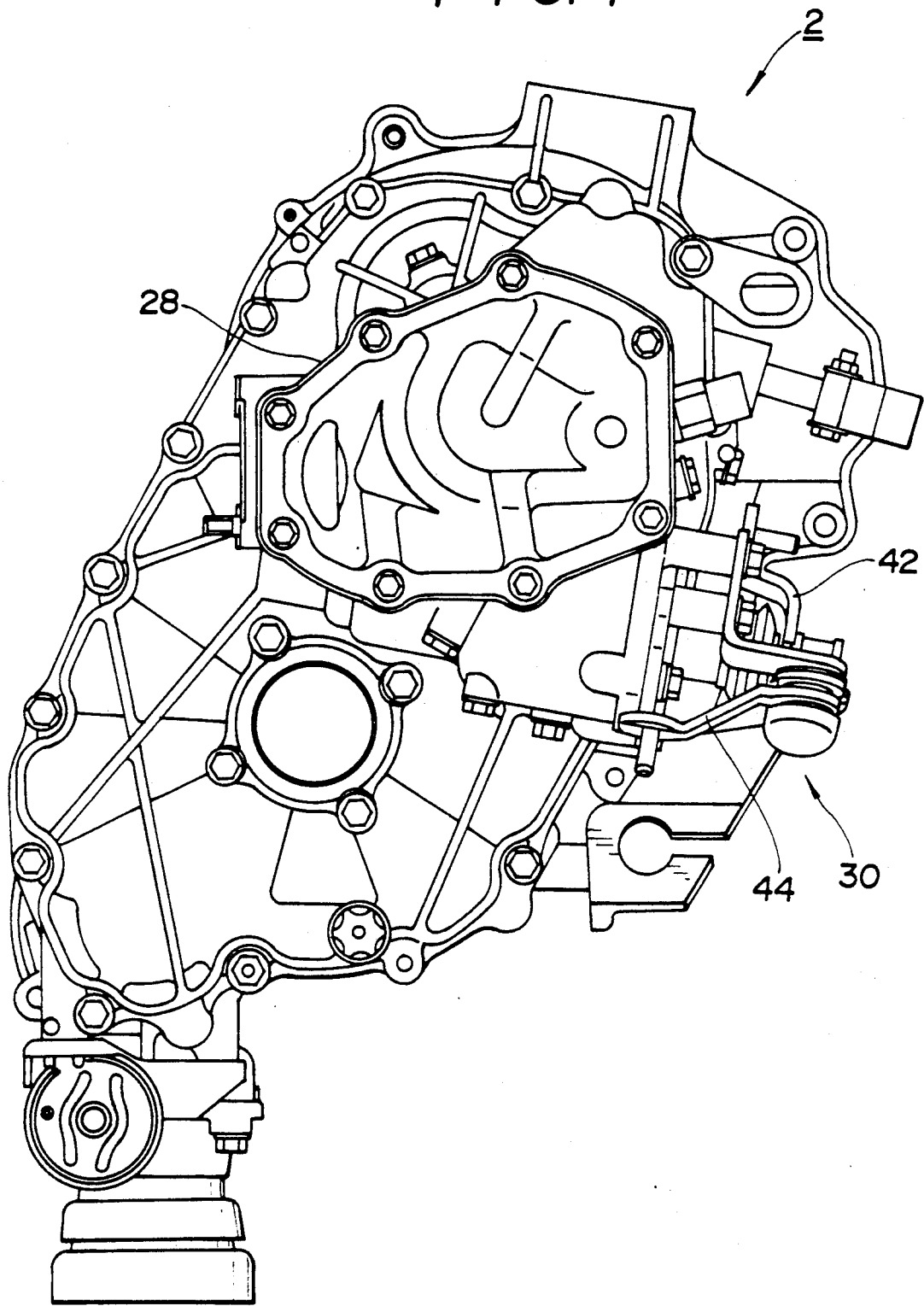
FIG. 4 is a left side view of the manual-operated transmission assembly showing a mounting state of the shift and unit.

Then, the other end 34b of the shift and select shaft 34 is inserted into the mounting hole 32 of the transmission case 28 so that the axis of shaft 34 extends substantially perpendicularly with respect to the axes of shafts 8 and 10. Thus, the shift system link mechanism 36 and the select system link mechanism 38 as mounted at the shaft end 34a are disposed outside of the transmission case 28 (see FIGS. 3-5).

When an operating lever (not shown) of the manual-operated transmission 2 is moved to the first speed position, the select lever 44 is swung in the direction A (FIG. 8) and the shift lever 42 is swung in the direction D. As a result, the low speed fork 52 is moved in the right-hand direction in FIG. 7. The movement of the low speed fork 52 then causes the low speed clutch sleeve 22 to be moved in the right-hand direction in FIG. 2 to engage the gear 13 so that the manual-operated transmission assembly 2 is in the first speed position.

Similarly, when the operating lever (not shown) of the transmission 2 is moved to the second speed position, the select lever 44 is swung in the direction A and the shift lever 42 is swung in the direction C. As a result, the low speed fork 52 is moved in the left-hand direction in FIG. 7. This movement of the low speed fork 52 causes the low speed clutch sleeve 22 to be moved in the left-hand direction in FIG. 2 to engage the gear 15 so that the transmission assembly 2 is in the second speed position.

Furthermore, when the operating lever (not shown) of the transmission assembly 2 is moved to the third speed position, the select lever 44 is maintained in the neutral position and the shift lever 42 is swung in the direction D. As a result, the high speed fork 54 is moved in the right-hand direction in FIG. 7. This movement of the high speed fork 54 then causes the high speed sleeve 24 to be moved in the right-hand direction in FIG. 5 to engage gear 16 and thereby bring the transmission assembly 2 into the third speed position.

Still further, when the operating lever (not shown) of the transmission assembly 2 is moved to the fourth speed position, the select lever 44 is maintained in the neutral position and the shift lever 42 is swung in the direction C. As a result, the high speed fork 54 is moved in the left-hand direction in FIG. 7. This movement of the high speed fork 54 causes the high speed clutch sleeve 24 to be moved in the left-hand direction in FIG. 2 to engage the gear 18 and thereby bringing the transmission assembly 2 into the fourth speed position.

When the operating lever (not shown) of the transmission assembly 2 is moved to the fifth speed position, the select lever 44 is swung in the direction B and the shift lever 42 is swung in the direction D. As a result, the fifth speed fork 56 is moved in the right-hand direction in FIG. 7, which movement causes the fifth speed clutch sleeve 26 to be moved in the right-hand direction in FIG. 2 to engage gear 20, thereby bringing the transmission assembly 2 into the fifth speed position.

Lastly, when the operating lever (not shown) of the transmission assembly 2 is moved to the reverse position, the select lever 44 is swung in the direction B and the shift lever 42 is swung in the direction C. As a result, the fifth speed fork 56 is moved in the left-hand direction in FIG. 7 to disengage gear 20, and the reverse idler gear 58 is moved in the left-hand direction in FIG. 2 to engage gear 59 and, thereby place the transmission assembly 2 to the reverse speed position.

Figure 8:
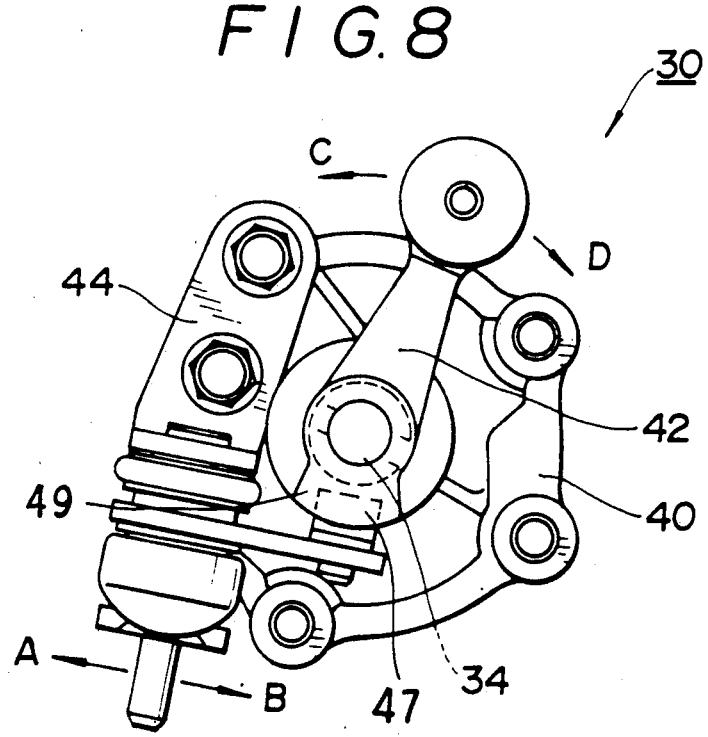
FIG. 8 is a schematic front view of the shift and select unit.

With respect to the various transmission speed positions described above, the select lever 44 is swung in the direction A shown in FIG. 8 for both first and second speed positions, and this position of select lever 44 causes the shaft 34 to be moved into its axially innermost position, in which position the shift fork actuator 61 (FIG. 6) as secured to the shaft 34 is aligned with and hence disposed for actuating solely the low-speed shift fork 52. Similarly to achieve the third and fourth speed positions of the transmission, the select lever 44 is maintained in the neutral position shown in FIG. 8, whereby the shaft 34 is hence maintained in its axially intermediate position so that fork actuator 61 is thus disposed for actuation solely with the high-speed shift fork 54. To achieve the fifth speed or reverse positions of the transmission, the select lever 44 is moved to position B in FIG. 8, which causes the shaft 34 to be moved axially outwardly to its outermost position, and hence causes the fork actuator 61 to be aligned and positioned for engagement solely with the fifth speed shift fork 56.

With the above, the shift and select unit 30 can be assembled beforehand, the number of assembling processes in the assembly line can be reduced, working performance can be improved, and mounting accuracy can be improved. Also, as the shift and select unit 30 is integrally formed as a separate unit, the unit 30 can thus be miniaturized. In addition, the shift and select unit 30 can be mounted on and removed from the transmission case 28 with ease, which is highly advantageous in actual use.

Furthermore, as the exposed or projecting portion of the shift and select unit 30 can be made small, the transmission case can be miniaturized. This contributes to a saving of space. Therefore, space around the transmission case 28, and particularly around the mounting part for the shift and select unit 30, can be effectively utilized.

According to the invention which has been described in detail in the foregoing, a shift and a select unit comprises a shift and select shaft which is to be inserted into the transmission case in such a manner as to be intersected with the transmission case at right angles relative to the transmission shafts, and the shift system link mechanism and the select system link mechanism are integral with one end of said shift and select shaft.

The arrangement used for connecting the operating lever (not shown), as disposed within the interior of the vehicle, to the shift lever 42 and select lever 44 is generally conventional, and hence has not been illustrated herein.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a transmission assembly for a vehicle including a transmission casing. at least two generally parallel transmission shafts rotatably supported within said casing, gear means coacting between said transmission shafts for defining plural drive paths having different speed ratios, axially shiftable clutch means coacting with said gear means for permitting selection of different drive ratios between said transmission shafts, and a shift and select means for effecting shifting and selecting of said clutch means, the improvement wherein said shift and select means comprises a shift and select unit including a shift and select shaft and means for rotatably and axially slidably supporting said shift and select shaft relative to said casing, said shift and select shaft projecting into the interior of said casing in generally perpendicular relationship with respect to the rotational axes of said transmission shafts, said shift and select shaft projecting outwardly through a wall of the transmission casing and having a shaft end portion of selected axial extend disposed exteriorly of said wall, said shift and select unit including a sleevelike mounting portion which surrounds the shaft end portion and rotatably and axially slidably supports said shift and select shaft, said sleevelike mounting portion being removably attached to and projecting outwardly from the wall of the transmission casing, a shift lever nonrotatably coupled to said shaft end portion and projecting radially thereof exteriorly of said mounting portion for effecting angular displacement of said shift and select shaft, and a select lever pivotally mounted on said mounting portion for pivoting movement relative thereto about a stationary pivot axis which extends in transverse and nonintersecting relationship with respect to the rotational axis of said shift and select shaft, said select lever being coupled to said shaft end portion and extending radially from said shaft end portion to said stationary pivot axis, said pivoting movement of said select lever effecting axial displacement of said shift and select shaft, said select lever being separate from and free of any control by said shift lever.

2. A transmission assembly according to claim 1, including a pair of axially spaced flanges which are secured to and project radially outwardly from said shaft end portion, said select lever having an actuator part which is confined axially between said flanges.

3. A transmission assembly according to claim 2, wherein said select lever is generally L-shaped, including a pair of crank arm which extend radially from said pivot axis in approximately perpendicular relationship with each other, said actuator part being mounted to a free end of one of said crank arms.

4. A transmission assembly according to claim 3, wherein said sleevelike mounting portion is axially elongated and has opposite axial ends, said sleevelike mounting portion having an axially facing, radially enlarged flange at an inner one of said axial ends, said radially enlarged flange having mounting holes formed axially therethrough for permitting removable attachment of said sleevelike mounting portion to the wall of the transmission casing with said radially enlarged flange in generally abutting relationship with the wall of the transmission casing, said radially enlarged flange supporting said shift and select shaft, said shaft end portion extending axially through said sleevelike mounting portion and projecting axially beyond an outer one of said axial ends to terminate in a free end, and said shift lever and said select lever being coupled to said free end adjacent said outer axial end of said sleevelike mounting portion.

* * * * *

UNITED STATES PATENT AND TRADEMARK OFFICE
CERTIFICATE OF CORRECTION

PATENT NO. : 5 052 239

DATED : October 1, 1991

INVENTOR(S) : Toshikazu UBAGAI

It is certified that error appears in the above-identified patent and that said Letters Patent is hereby corrected as shown below:

Column 6, line 17; change "extend" to ---extent---.
Column 6, line 46; change "crank arm" to ---crank arms---.

Signed and Sealed this

Ninth Day of November, 1993

Attest:

BRUCE LEHMAN

*Attesting Officer*   *Commissioner of Patents and Trademarks*